US011180052B2

(12) United States Patent
Quintao Severgnini et al.

(10) Patent No.: US 11,180,052 B2
(45) Date of Patent: Nov. 23, 2021

(54) RECONFIGURABLE SOFT ROBOTICS-BASED VEHICLE INTERIOR FOR INFANT BOARDING

(71) Applicant: TOYOTA MOTOR ENGINEERING & MANUFACTURING NORTH AMERICA, INC., Plano, TX (US)

(72) Inventors: Frederico Marcolino Quintao Severgnini, Ann Arbor, MI (US); Sean Rodrigues, Ann Arbor, MI (US); Ercan Mehmet Dede, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/736,764

(22) Filed: Jan. 7, 2020

(65) Prior Publication Data
US 2021/0206295 A1    Jul. 8, 2021

(51) Int. Cl.
*B60N 2/02* (2006.01)
*B60N 2/26* (2006.01)
*B60N 2/00* (2006.01)
*B60N 2/32* (2006.01)

(52) U.S. Cl.
CPC ........... *B60N 2/0244* (2013.01); *B60N 2/002* (2013.01); *B60N 2/26* (2013.01); *B60N 2/32* (2013.01); *B60N 2002/0268* (2013.01)

(58) Field of Classification Search
CPC .... B60N 2/0244; B60N 2/002; B60N 2/0224; B60N 2/02; B60N 2/26; B60N 2/32; B60N 2002/0268

USPC ...................................................... 297/217.2
See application file for complete search history.

(56) References Cited

U.S. PATENT DOCUMENTS

| | | | |
|---|---|---|---|
| 4,592,588 A * | 6/1986 | Isono | A47C 7/467 297/284.6 |
| 5,292,175 A * | 3/1994 | Artz | B60N 2/2806 297/250.1 |
| 5,556,169 A | 9/1996 | Parrish | |
| 8,398,170 B2 * | 3/2013 | Walker | A47C 7/14 297/284.3 |
| 8,733,843 B2 * | 5/2014 | Franz | B60N 2/643 297/452.28 |
| 9,776,537 B2 * | 10/2017 | Dry | B60N 2/686 |
| 9,796,303 B1 | 10/2017 | Schonfeld | |
| 10,214,129 B2 * | 2/2019 | Jaranson | B60N 2/06 |
| 10,562,412 B1 * | 2/2020 | Main | A61B 5/6893 |

(Continued)

FOREIGN PATENT DOCUMENTS

GB       2468648 A       9/2010

*Primary Examiner* — Mark R Wendell
(74) *Attorney, Agent, or Firm* — Sheppard, Mullin, Richter & Hampton LLP; Hector A. Agdeppa; Daniel N. Yannuzzi

(57) ABSTRACT

Systems and methods for a reconfigurable soft robotics-based vehicle interior is provided. The soft-robotics based vehicle interior comprises a child seat portion disposed in a vehicle seat, the child seat portion comprising a child seat constructed of highly compliant materials and mechanisms. When required, the highly compliant materials and mechanisms may be manipulated such that the child seat portion is moved from a retracted state to an engaged state. The child seat may also manipulate the highly complaint materials and mechanisms based on an anatomy of a child to provide customizable support for the child.

20 Claims, 11 Drawing Sheets

(56) References Cited

U.S. PATENT DOCUMENTS

| | | | |
|---|---|---|---|
| 2009/0072604 A1* | 3/2009 | Browne | H04Q 9/00 |
| | | | 297/354.1 |
| 2009/0174246 A1 | 7/2009 | Kaip | |
| 2012/0086249 A1* | 4/2012 | Hotary | B60N 2/838 |
| | | | 297/284.3 |
| 2019/0009695 A1* | 1/2019 | Schonfeld | B60N 2/0292 |
| 2019/0059608 A1* | 2/2019 | Yan | B60N 2/665 |
| 2019/0118691 A1 | 4/2019 | Reith | |
| 2020/0307432 A1* | 10/2020 | Nagasawa | B60N 2/914 |
| 2020/0346106 A1* | 11/2020 | Lee | A63F 13/218 |

\* cited by examiner

RECONFIGURABLE SOFT ROBOTICS-BASED VEHICLE INTERIOR FOR INFANT BOARDING

TECHNICAL FIELD

The present disclosure relates generally to child seats, and in particular, some implementations may relate to reconfigurable child seats made of conformable materials.

DESCRIPTION OF RELATED ART

Elastomers are polymers with viscosity and elasticity (i.e., viscoelasticity), with properties allowing considerable molecular reconformation without breaking the covalent bonds holding the atoms together. Because of these properties, elastomers can be used to create structures that change shape by the application of fluidic force, heat, electricity, and/or magnetism, among other stressors. When such external force is applied to put the elastomer under stress, the molecules of the elastomer rearrange into an intended shape. Soft robotics, the construction of robots and other devices out of highly compliant materials, is one field in which elastomers are well-suited, given the compliant-nature of elastomers.

BRIEF SUMMARY OF THE DISCLOSURE

According to various embodiments of the disclosed technology, a reconfigurable vehicle interior is provided. The reconfigurable vehicle interior in accordance with embodiments of the technology disclosed herein comprises a rear seat comprising a child seat portion, the child seat portion comprising a plurality of conformable regions; one or more sensors communicatively coupled to a processor configured to control operation of the child seat portion; and one or more devices communicatively coupled to the processor, each of the devices configured to apply a stimuli to a highly compliant material, wherein each conformable region of the plurality of conformable regions comprises one or more highly complaint materials configured to conform the child seat portion to an anatomy of a child in response to application of a stimulus by at least one of the one or more devices. In various embodiments, the child seat portion may be disposed in a back portion of the rear seat, while in other embodiments a first part of the child seat can be disposed in a back portion of the rear seat and a second part of the child seat can be disposed in a bottom portion of the rear seat. The child seat may not be identifiable when in a retracted state. In various embodiments, the plurality of conformable regions may comprise one or more conformable back regions, one or more conformable side regions, and one or more conformable base regions. In various embodiments, the processor is configured to determine the anatomy of the child based on data received from one or more of the sensors.

In various embodiments, a method of operating a reconfigurable child seat comprising determining, by a processor associated with a child seat portion of a rear seat of a vehicle, a child seat is needed; identifying, by the processor, an anatomy of a child; determining, by the processor, one or more configuration parameters for one or more conformable regions of the child seat portion based on the identified anatomy; and manipulating, by the processor, the one or more conformable regions based on the determined configuration parameters. In various embodiments, determining the child seat is needed comprises detecting an activation signal by one or more activation sensors. In various embodiments, identifying the anatomy of the child comprises capturing a plurality of images of the child by one or more image sensors. In various embodiments, determining the configuration parameters comprises retrieving one or more database records from a memory associated with the child seat portion. In various embodiments, wherein manipulating the one or more conformable regions comprises applying at least one type of stimuli to one or more highly compliant materials disposed within the conformable region.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
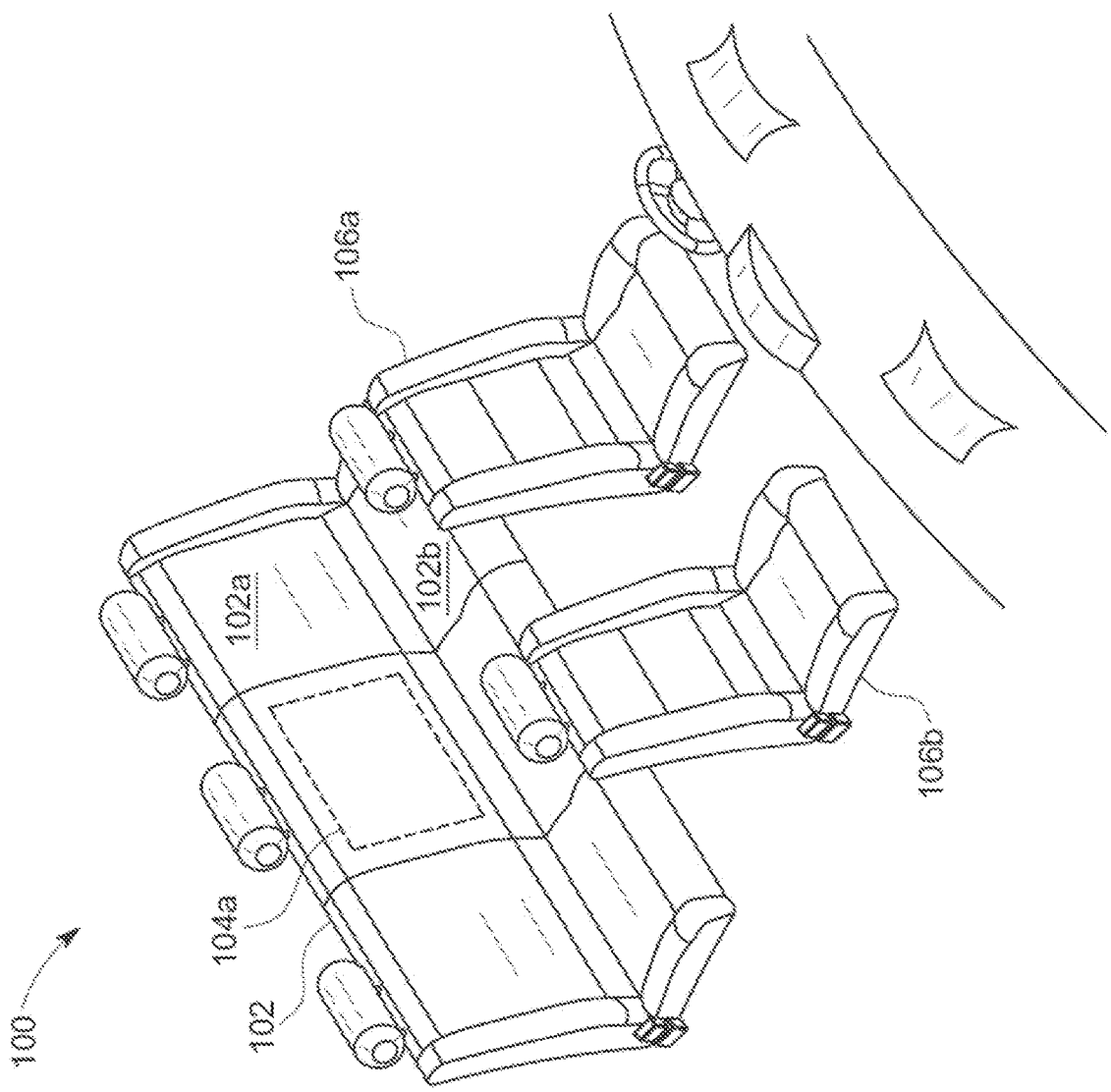
FIG. 1 illustrates an example vehicle interior in accordance with embodiments of the technology disclosed herein.

The figures are not exhaustive and do not limit the present disclosure to the precise form disclosed.

DETAILED DESCRIPTION

Child seats (including baby seats and booster seats) are generally accessories that need to be installed within a vehicle. Traditional child seats are often bulky, taking up a large amount of space within the backseat of a vehicle.

Moreover, the manual installation of child seats is often a time-consuming and unwieldy task due to the bulky size and safety concerns. Most child seats, especially those for infants, need to be anchored to ensure proper safety for the child. This anchoring requires seatbelts to be carefully threaded through connection points on the child seat and/or tethering the seat to built-in anchors within the vehicle interior. Although some booster seats may utilize the weight of the child to maintain its position, such booster seats are still bulky and still require proper buckling of the child in the seat to ensure that the booster seat does not unsafely shift during operation and/or an accident.

In recent years, child seats have been built into the seats of the vehicle, minimizing the need for an external accessory. Some example built-ins comprise a base that can be pulled down from the back of a vehicle seat or pulled up from the base of a vehicle seat, creating a higher base upon which to place the child. In some other embodiments, different portions of a vehicle seat can be adjustable to accommodate children, enabling the same seat to work for both children and adults.

Whether as an accessory or part of a built-in system, parents or other operators tend to incorrectly install and/or use the child seats. Due to the bulkiness of child seats and the tight space in vehicle interiors, there is not a lot of space in which the person can move to position the child and secure the child in the seat. This is increasingly more difficult when the child is being uncooperative. Improper installation may result in improper buckling of the child, putting the child's health at risk. Moreover, failure to properly install and/or buckle the child in can result in insufficient support for the child's spine, head, and neck. This can be further exasperated due to the one-size-fits-all design approach of most child seats, which fail to take into account physiological differences in children. The one-size-fits-all design further results in a lack of leg room for children when seated in child seats, especially booster seats, when the child has grown but is still of a size and/or age for which a booster seat is required by law. Not only are the child seats constructed in such a manner that there is little ability to accommodate for differences in the child's size, the rear seats of vehicles generally provide little give in the horizontal direction (i.e., the child seat can only push into the rear seat so far).

The difficulty is further complicated due to the lack of space in which an adult (e.g., a parent) can maneuver to properly buckle the child into the seat. The bulky size of conventional child seats reduces the already limited space and, within the confines of the vehicle, the size of the child seats makes it tough for a person to optimally position themselves when trying to strap in the child. Moreover, although some elements of the vehicle interior may be moved to create some additional space (e.g., moving the front seats forward), the shape and construction of such elements limit the amount of space that can be created.

Embodiments of the systems and methods disclosed herein provide a reconfigurable child seat incorporated into the seats of a vehicle. In various embodiments, the reconfigurable child seat can comprise highly compliant materials and mechanisms capable of conforming the shape, size, and rigidity of the child seat to accommodate for anatomical differences between children. The reconfigurable child seat can be conformed based on input from a variety of sensors disposed both in and around the child seat to ensure that the seat is configured to provide the necessary and child-specific support and safety. In various embodiments, the reconfigurable child seat can further be configurable to make boarding of children easier by providing an intermediate load position providing an easier loading experience. By building the reconfigurable child seat into the vehicle seats using highly compliant materials and mechanisms, embodiments of the present disclosure provide a built-in option that, when not in use, does not impact the use of the vehicle seat for non-child occupants and, when in use, provides more optimal support for the child's head, spine, neck, and legs.

FIG. 1 depicts an example vehicle interior 100 in accordance with embodiments of the technology disclosed herein. The vehicle interior 100 is provided for illustrative purposes only and should not be interpreted as limiting the scope of the technology to only the illustrated embodiment. For ease of discussion, the technology shall be discussed with reference to vehicle interior 100, but a person of ordinary skill in the art would understand that elements of the illustrated embodiment may be applicable in other environments individually or in combination. Further, the illustrated vehicle interior 100 is drawn with exaggerated dimensions for ease of discussion and should not be interpreted as requiring any specific vehicle interior 100 shape, size, and/or the placement of particular components within the interior (e.g., seat positions). Also, a person of ordinary skill in the art would understand that other components of a vehicle (e.g., doors, roof, etc.) are omitted from FIG. 1 but would be present in implementations, and the omission of such components should not be interpreted as limiting the scope of the technology disclosed herein.

Referring to FIG. 1, the vehicle interior 100 includes a rear seat 102 comprising a back portion 102a and a base portion 102b. As illustrated in FIG. 1, the rear seat 102 is depicted as a bench-style seat with a child seat portion 104 disposed in the middle of the rear seat 102. In other embodiments, the rear seat 102 could comprise a bucket-style vehicle seat, like the front seats 106a, 106b of vehicle interior 100. Although discussed with respect to the illustrated embodiment of FIG. 1, a person of ordinary skill in the art would understand that the technology disclosed herein is applicable to bucket-style or other non-bench-style vehicle seats. When not in use, the reconfigurable child seat can be in a retracted position within the child seat portion 104 such that the child seat portion 104 is flush or substantially flush with the back portion 102a of the rear seat 102. The child seat portion 104 is considered substantially flush with the back portion 102a where the middle area of the rear seat 102 is usable as a seat for an adult.

Figure 2A:
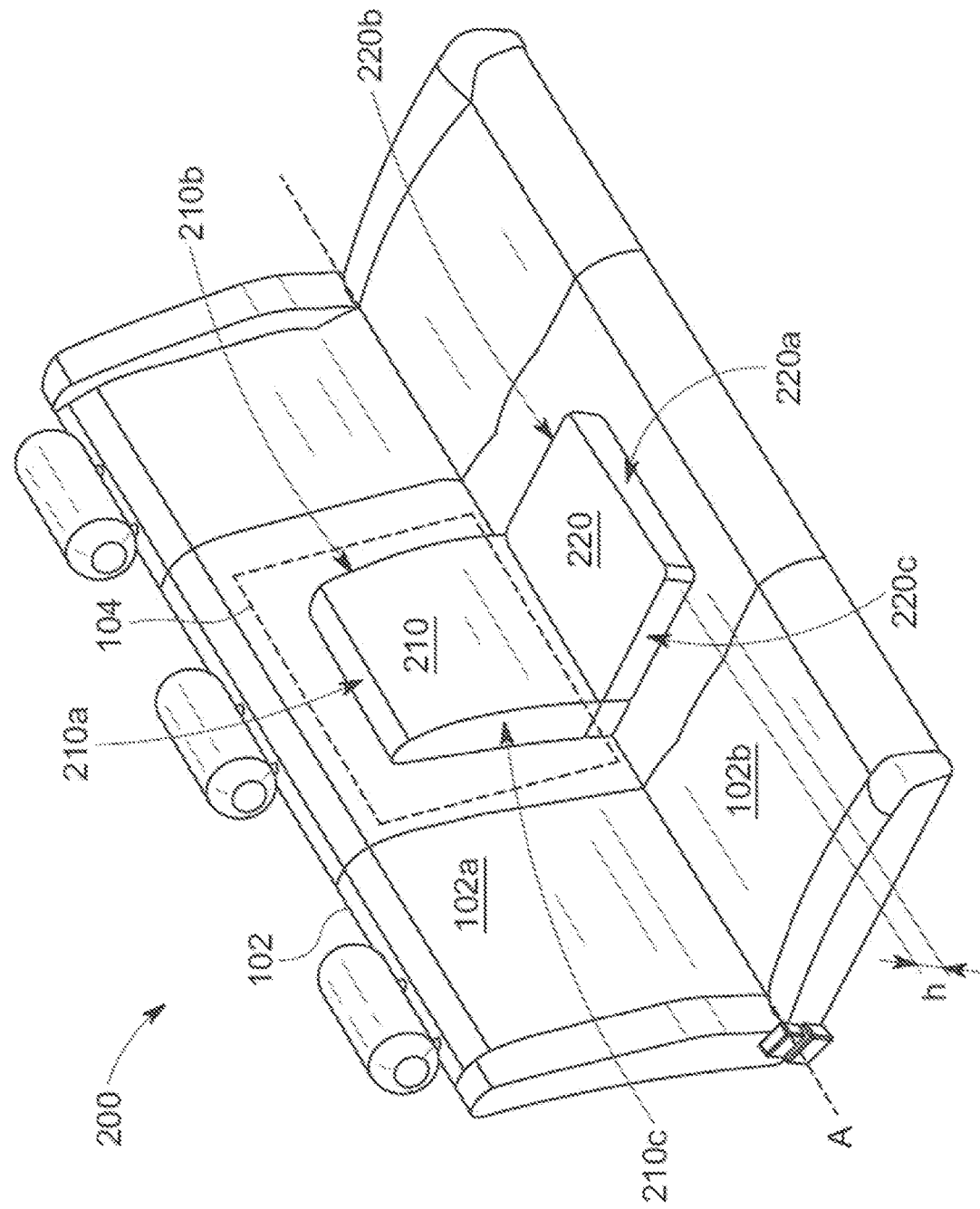
FIG. 2A illustrates an example reconfigurable child seat in accordance with embodiments of the technology disclosed herein.

In various embodiments, the child seat portion 104 may comprise a first part in the back portion 102a (as shown in FIG. 1) and a second part in the base portion 102b (not shown in FIG. 1). FIG. 2A illustrates an example reconfigurable child seat 200A in accordance with embodiments of the technology disclosed herein. As depicted in FIG. 2A, the reconfigurable child seat 200 is contained within the child seat portion 104 of the rear seat 102. The child seat portion 104 in FIG. 2A is shown as being contained in the back portion 102a of the rear seat 102. When not in use (i.e., in a retracted state), the child seat portion 104 can be configured such that the entire length of the rear seat 102 can be used by adults and children over a threshold child size. In some embodiments, the child seat portion 104 can be activated such that a child that is small enough to require additional height and/or support can be securely strapped into the vehicle. In FIG. 2A, when activated the second part 220 of the child seat portion 104 can be pivoted into an engaged position wherein the second part 220 sits on top of the bottom portion 102b of the rear seat 102. In the engaged position, the first part 210 of the child seat portion 104 is exposed.

In some embodiments, the second part 220 may be manually set in the engaged position in a manner similar to retractable armrests or other retractable accessories of vehicle seats known in the art. As a non-limiting example, the second part 220 can include a handle, recess, strap, or other mechanism disposed on a top 220a of the second part 220 that may be used by a person to move the second part 220 into the engaged position shown in FIG. 2A. When force is applied, the second part 220 may pivot around an axis A running along the length of the rear seat 102. The pivoting action may be accomplished in a variety of different ways known in the art. In some embodiments, one or more mechanisms may be disposed on one or both sides 220b, 200c of the second part 220 such that a person can move the second part 220 into the engaged position.

In some embodiments, the second part 220 may be moved into the engaged position automatically without manual intervention. In some embodiments, one or more actuators may be used to move the second part 220 from the retracted state into the engaged state. The one or more actuators (not shown in FIG. 2A) may comprise compliant mechanisms having one or more parts constructed of compliant materials and/or elastomeric materials. Non-limiting examples of the types of compliant materials that may be used include liquid crystal elastomers (LCEs), shape-memory alloys (SMAS), electroactive polymers (EAPs), piezoelectric materials, magnetic shape memory alloys, temperature-responsive polymers, ferrofluids, photomechanical materials, dielectric elastomers (DEs), among others. The one or more actuators may comprise a combination of compliant and rigid materials to form complaint mechanisms capable of moving the second part 220 into the engaged state from the retracted state. As a non-limiting example, an actuator can be constructed of several rigid structures connected by a plurality of hinges made of complaint materials. When a stimulus is applied to the compliant material hinges, the hinges are configured to change shape and/or size to cause the actuator to change from a first shape to a second shape, the transformation resulting in a force being applied to cause the second part 220 to move to the engaged state. Activation of the one or more actuators may be triggered manually or automatically based on one or more sensors (discussed in greater detail with respect to FIG. 7).

In some embodiments, the second part 220 may also comprise compliant materials such as those discussed above with respect to the one or more actuators. For example, the second part 220 may comprise complaint materials encompassing the one or more actuators. When the one or more actuators are activated, the compliant material encompassing the one or more actuators can be reconfigured such that the second part 220 is formed into a platform to serve as a seat for the child. In some embodiments, the compliant material encompassing the actuators may also be configured such that the application of one or more stimuli to the encompassing material also can change in shape and/or size due to the stimulation. In various embodiments, the second part 220 may be in a first shape (not shown in FIG. 2A) when in the retracted state and a second shape when in the engaged state (shown in FIG. 2A). In the first shape, the second part 220 may have a first height (not shown in FIG. 2A) equivalent to a depth of the back portion 102a of the rear seat 102 into which the second part 220 extends when in the retracted state. When activated, the second part 220 may be changed (due to one or more actuators, application of stimuli to the encompassing compliant material, or a combination of both) such that the second part 220 is defined by a second height h. The second height h defines the maximum height of the second part 220 when in the engaged state. As discussed in greater detail below, the overall shape of the second part 220 can be reconfigured to customize the shape for each child's anatomy, thereby providing a more secure and unique riding experience. The interior area of the second part 220 and the height across the top side 220a may vary to accommodate the different anatomies. In this manner, the second part 220 can be reconfigurable from the retracted state to the engaged state without the need for a rigid structure defining the seat portion of the child seat portion 104.

As shown in FIG. 2A, the first part 210 of the child seat portion 104 is exposed when the child seat portion 104 is in an engaged state. In some embodiments, the first part 210 may be generated out of the back portion 102a of the rear seat 102 when the child seat portion 104 is activated. In such embodiments, the first part 210 can be constructed in a similar manner as that discussed above with respect to the second part 220, comprising a combination of compliant and rigid structures configured to move from a retracted state to an engaged state. As a non-limiting example, the top side 210a and the sides 210b, 210c can comprise a combination of actuators and/or compliant materials configured to form the first part 210 out of the rear seat 102 within the child seat portion 104. In other embodiments, the first part 210 may be recessed (not shown in FIG. 2A) into the back portion 102a of the rear seat 102 and may be formed out of the recess of the back portion 102a of the rear seat 102 in a manner similar to the generation of the first part 210 discussed above.

Figure 2B:
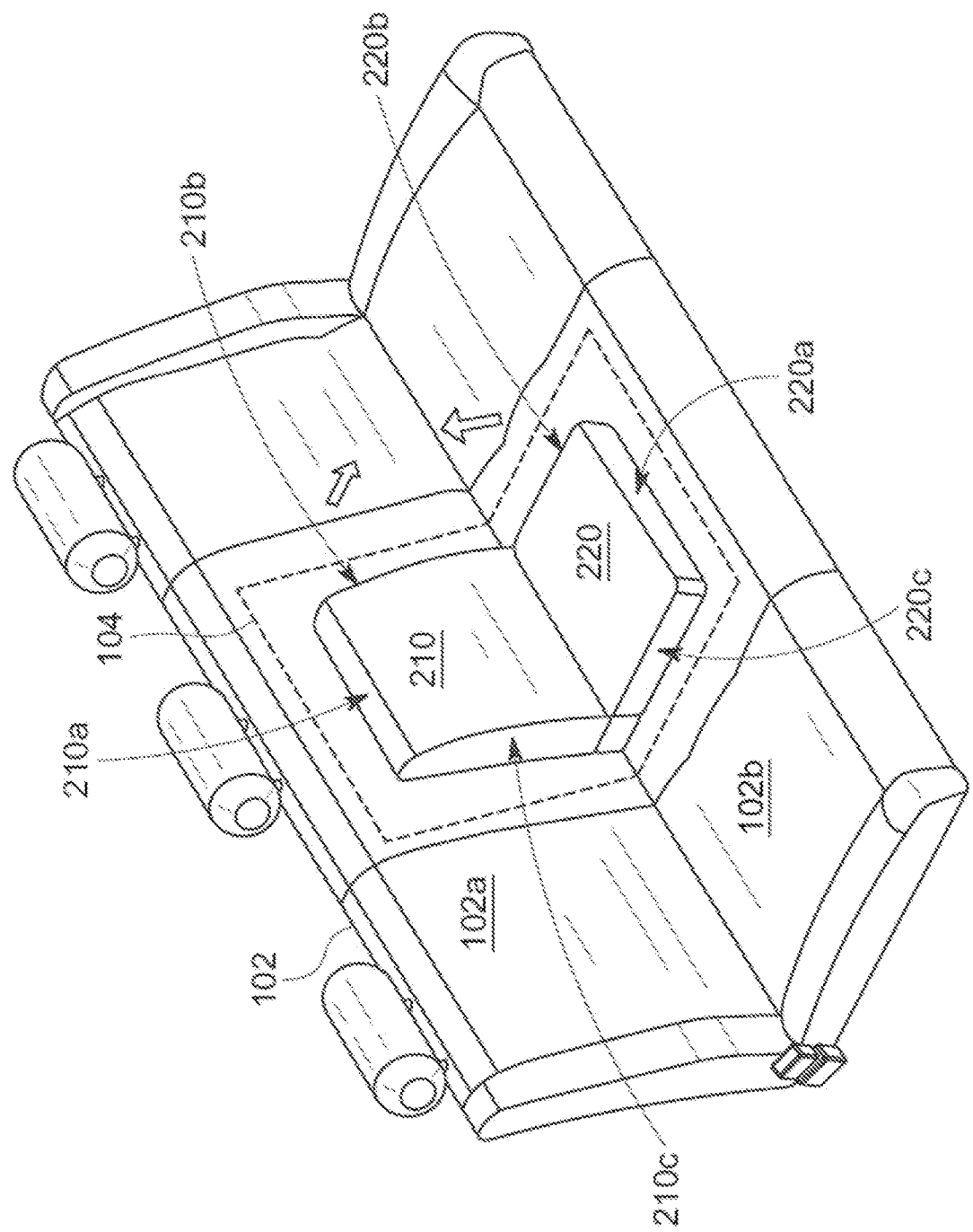
FIG. 2B illustrates another example reconfigurable child seat in accordance with embodiments of the technology disclosed herein.

In some embodiments, the child seat portion 104 may extend across both the back portion 102a and the bottom portion 102b of the rear seat 102. FIG. 2B illustrates another example child seat portion 104 in accordance with embodiments of the technology disclosed herein. As illustrated in FIG. 2B, the first part 210 of the child seat portion 104 is disposed in the back portion 102a of the rear seat 102 and the second part 220 is in the bottom portion 102b of the rear seat 102. In the retracted state, the child seat portion 104 of the back portion 102a and bottom portion 102b can be flush with the back portion 102a and the bottom portion 102b, respectively, such that the child seat portion 104 is usable by an adult or large-enough child can use the rear seat 102 without modification.

When activated, the first part 210 and the second part 220 can be extended into an engaged state from the back portion 102a and the bottom portion 102b, respectively, as shown in FIG. 2B. Discussions of the same reference with respect to different figures should be interpreted as being applicable to all instances of the reference unless otherwise stated explicitly. In various embodiments, the first part 210 and the second part 220 can be extended manually in a manner similar to the manual action discussed above with respect to FIG. 2A. In some embodiments, the first part 210 and the second part 220 can automatically be extended into the engaged state in a manner similar to that discussed above with respect to FIG. 2A. As opposed to one or more actuators causing the second part 220 to pivot into the engaged state, the one or more actuators may be configured to form the first part 210 and/or the second part 220 out of the back portion 102a and/or the bottom portion 102b of the rear seat 102, respectively. In some embodiments, the first part 210 and/or the second part 220 may extend into a recess formed in the back portion 102a and/or the bottom portion 102b, respectively, similar to the recess discussed above with respect to FIG. 2A.

Figure 3:
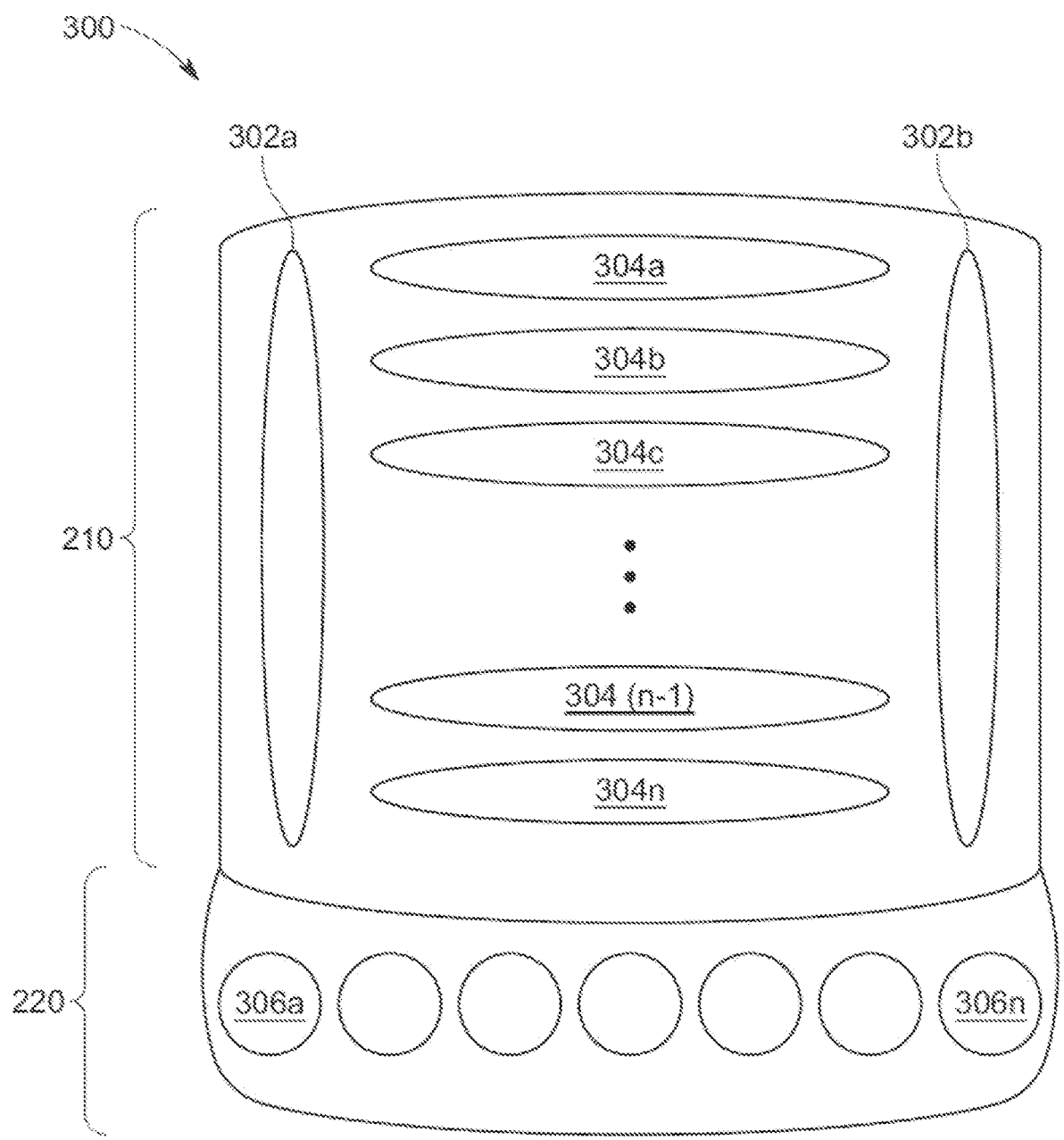
FIG. 3 is an example child seat in accordance with embodiments of the technology disclosed herein.

FIG. 3 illustrates an example child seat 300 in accordance with embodiments of the technology disclosed herein. The child seat 300 is provided for illustrative purposes only and should not be interpreted as limiting the technology only to the illustrated embodiment. The child seat 300 can comprise the first part 210 and the second part 220 of the child seat portion 104 discussed with respect to FIGS. 1, 2A, and 2B. In various embodiments, the child seat 300 can be separated into different compliant portions that, along or in combination with each other, can be manipulated to reconfigure the child seat 300 such that it is customized to accommodate the anatomy of different children. As shown in FIG. 3, the first part 210 can comprise a plurality of conformable side regions 302a, 302b (collectively, "conformable side regions 302") and a plurality of conformable back regions 304a-304n (collectively, "conformable side regions 304"), and the second part 220 can comprise a plurality of conformable base regions 306a-306n (collectively, "conformable base regions 306").

Each of the conformable side regions 302, conformable back regions 304, and conformable base regions 306 (collectively, "the conformable regions") can comprise a combination of rigid structures, compliant materials, and compliant mechanisms, such as those discussed above with respect to FIGS. 1, 2A, and 2B. In some embodiments, a subset of conformable regions of a given type may comprise different elements than other regions of that type. As a non-limiting example, a subset of the conformable base regions 306 can comprise one or more actuators configured to transform from a first state to a second state when the child seat 300 is activated to move from a retracted state to an engaged state encompassed by a complaint material, similar to that discussed with respect to FIGS. 2A and 2B, while another subset of the conformable base regions 306 may comprise compliant material configured to change from a first shape to a second shape. In this way, different types of conformation can be used together to result in a reconfigured child seat 300 in a given position/state. In some embodiments, the compliant material may be configured such that the application of stimuli can change the properties of the material, including but not limited to the rigidity of the material.

Although the conformable side regions 302, conformable back regions 304, and conformable base regions 306 (collectively, "the conformable regions") are shown in a given arrangement in FIG. 3, the technology described herein is not limited to only the illustrated arrangement. In various embodiments, more or fewer regions may be included to provide greater or less resolution in the shapes and configurations which the child seat 300 can achieve when in use.

Figure 4A:
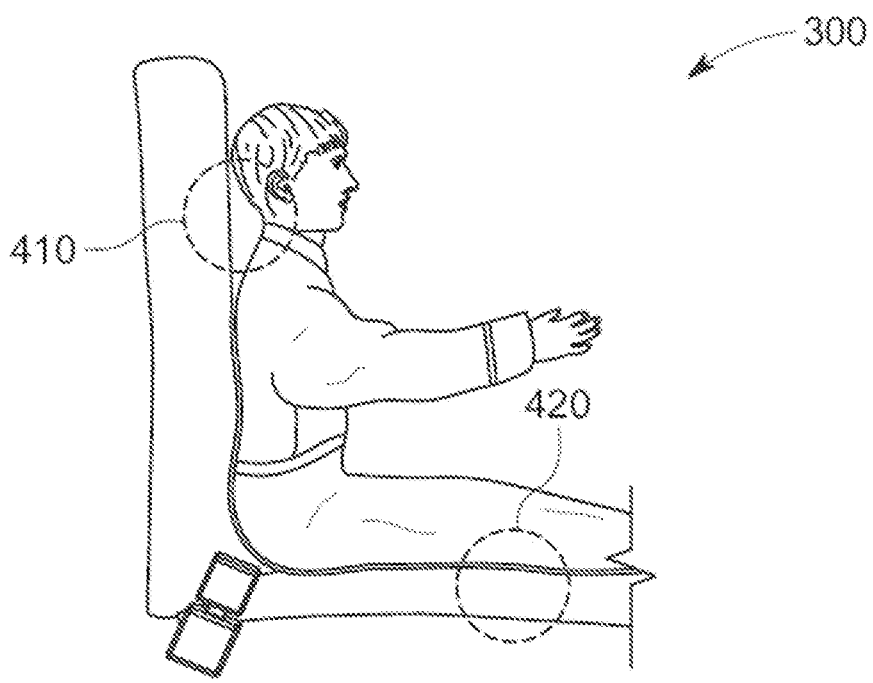
FIG. 4A illustrates the example child seat of FIG. 3 in a first state in accordance with embodiments of the technology disclosed herein.
Figure 4B:
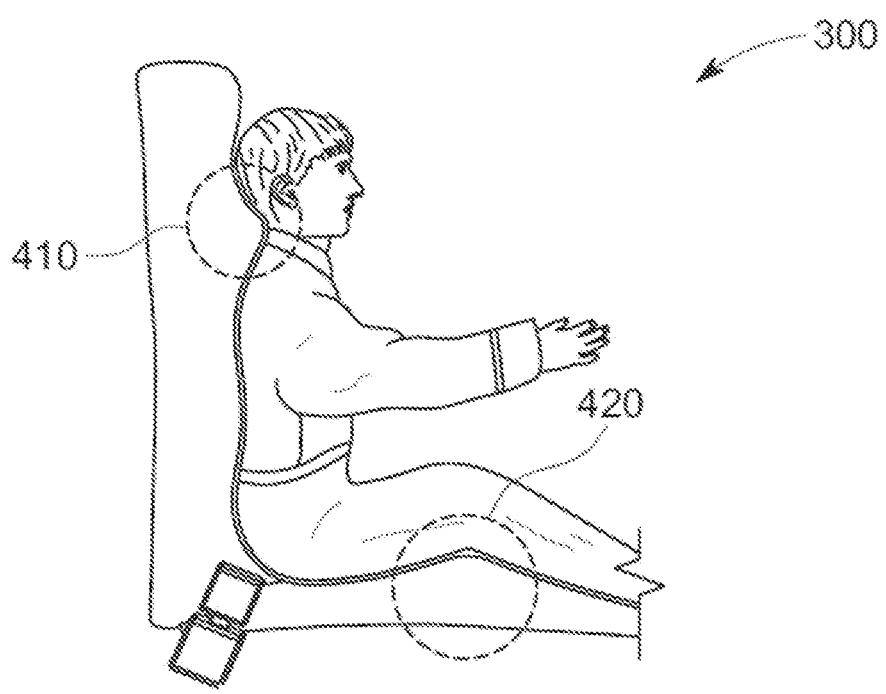
FIG. 4B illustrates the example child seat of FIG. 3 in a second state in accordance with embodiments of the technology disclosed herein.

FIGS. 4A and 4B illustrate how a child seat 300 of FIG. 3 can conform to a child's anatomy in accordance with embodiments of the technology disclosed herein. FIG. 4A depicts the child seat 300 in an initial state. As shown, the child seat 300 does not accommodate the specific anatomy of the child. For example, in the neck region 410 the child seat 300 does not change its shape or position, resulting in less support being applied to the child's neck in the neck region 410. For children with less stable neck muscles (such as younger children) this lack of support could increase the risk of injury during operation of the vehicle. In other words, the child seat 300 maintains the same shape or position regardless of the specific anatomy of the child using the seat.

FIG. 4B depicts the child seat 300 of FIG. 3 in a reconfigured arrangement based on the child's anatomy. As can be seen moving from FIG. 4A to FIG. 4B, the child seat 300 in the neck region 410 is configured to provide greater support by conforming to the specific shape of the child's neck. In this manner, embodiments of the technology disclosed herein are capable of providing greater support in a customizable manner. Conformance based on the child's anatomy can be performed across the entire length of the child seat 300 portion in contact with the child. As a non-limiting example, the knee region 420 in FIG. 4A is shown as not fully supporting the child's knee, but the child seat 300 in FIG. 4B is shown as changing its shape to more fully contact and support the child's knee in FIG. 4B. In other words, the child seat 300 can mold itself to the specific anatomy of the child using the seat to provide unique and customizable support, unlike traditional child seats lacking highly compliant materials. In various embodiments the child seat 300 can be reconfigured to account for movement of the child during use to ensure that the child is supported during operation.

Figure 5:
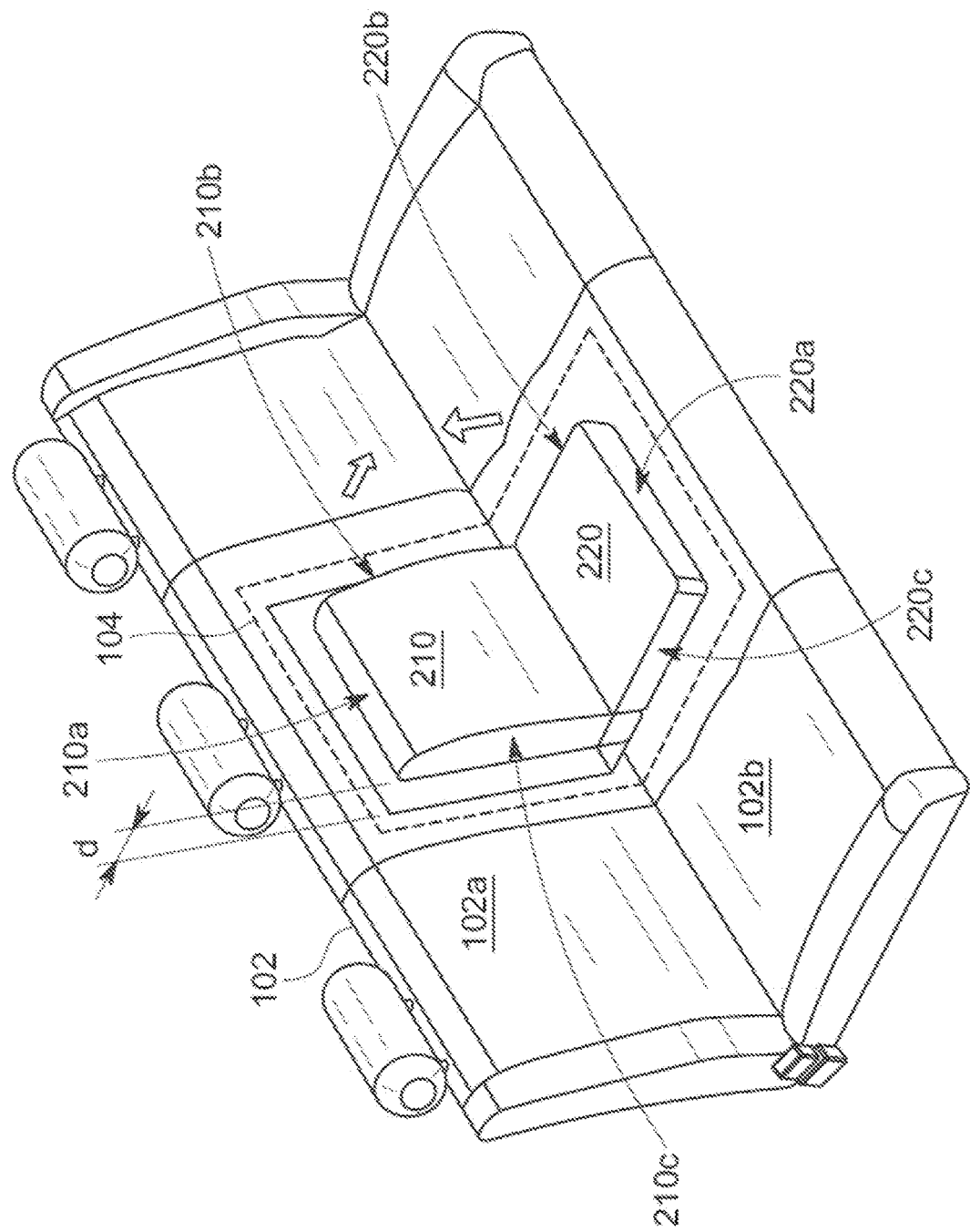
FIG. 5 illustrates an example reconfigurable child seat in an intermediate state in accordance with embodiments of the technology disclosed herein.

In some instances, strapping a child into a child seat in a vehicle can be difficult because of the small space. In various embodiments, child seats in accordance with the technology disclosed herein can be configured into an intermediate state to facilitate strapping a child into the vehicle. FIG. 5 illustrates an example child seat in an intermediate state in accordance with embodiments of the technology disclosed herein. The intermediate state depicted in FIG. 5 shall be discussed with respect to the illustrated embodiment of FIG. 2B for illustrative purposes only and should not be interpreted as limiting the scope of the technology to only the depicted embodiment. As shown in FIG. 5, the first part 210 can move into an intermediate state where the first part 210 is extended out a distanced from the back portion 102a of the rear seat 102. In this way, a child can be placed and strapped into the seat in an easier manner. In various embodiments, placing the first part 210 in an intermediate state can be accomplished in a similar manner as the reconfiguration discussion of the child seat portion 104 discussed with respect to FIGS. 1-4B above. In some embodiments, one or more additional intermediate actuators (not shown in FIG. 5) may be disposed in the child seat portion 104 to enable, manually or automatically, for the child seat portion 104 to be placed in the intermediate state. In some embodiments, the second part 220 may be configured to enter an intermediate state in a similar manner as the first part 210 discussed above, while in other embodiments both the first part 210 and the second part 220 may be configured to enter an intermediate state.

Figure 6A:
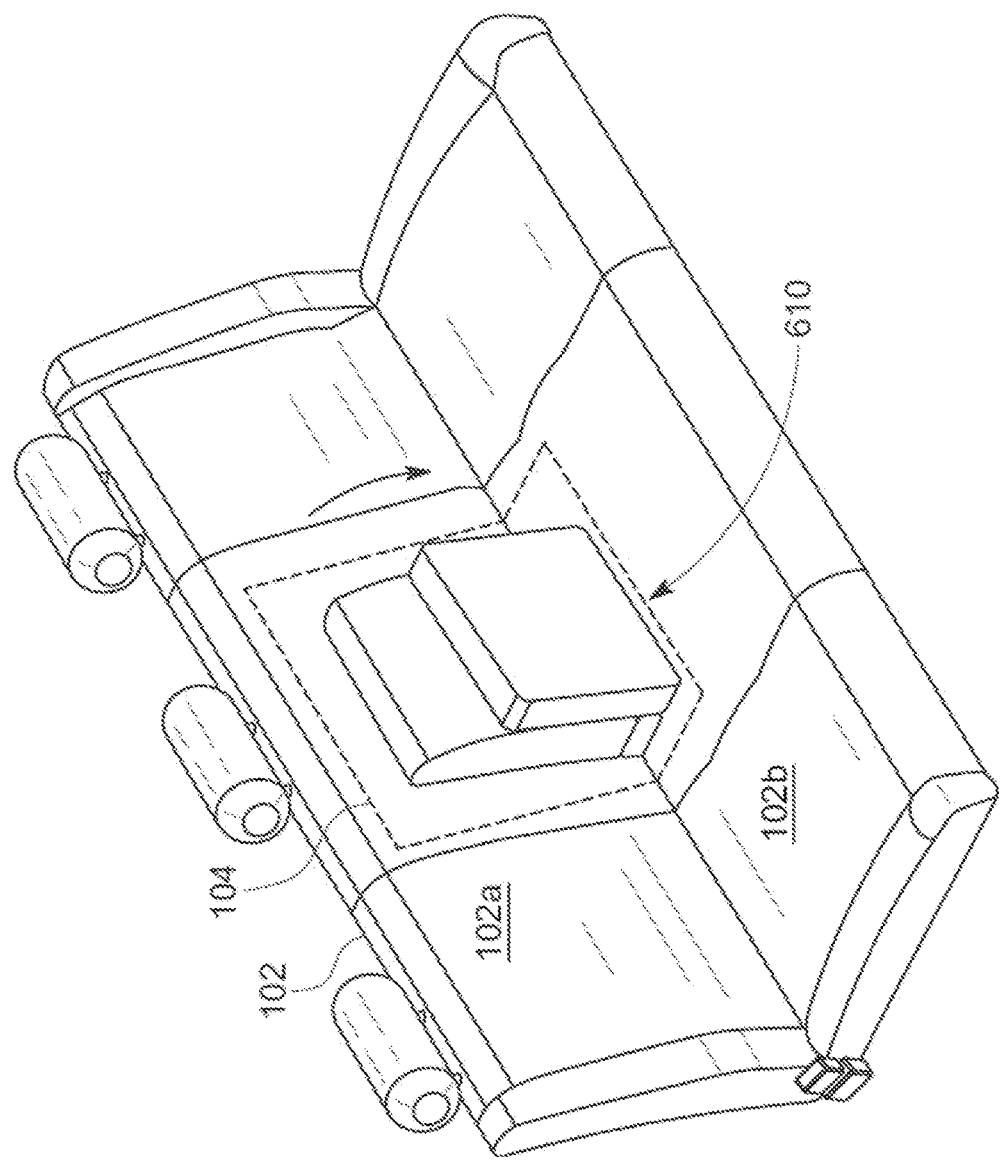
FIG. 6A is an example rear-facing child seat in accordance with embodiments of the technology disclosed herein.
Figure 6B:
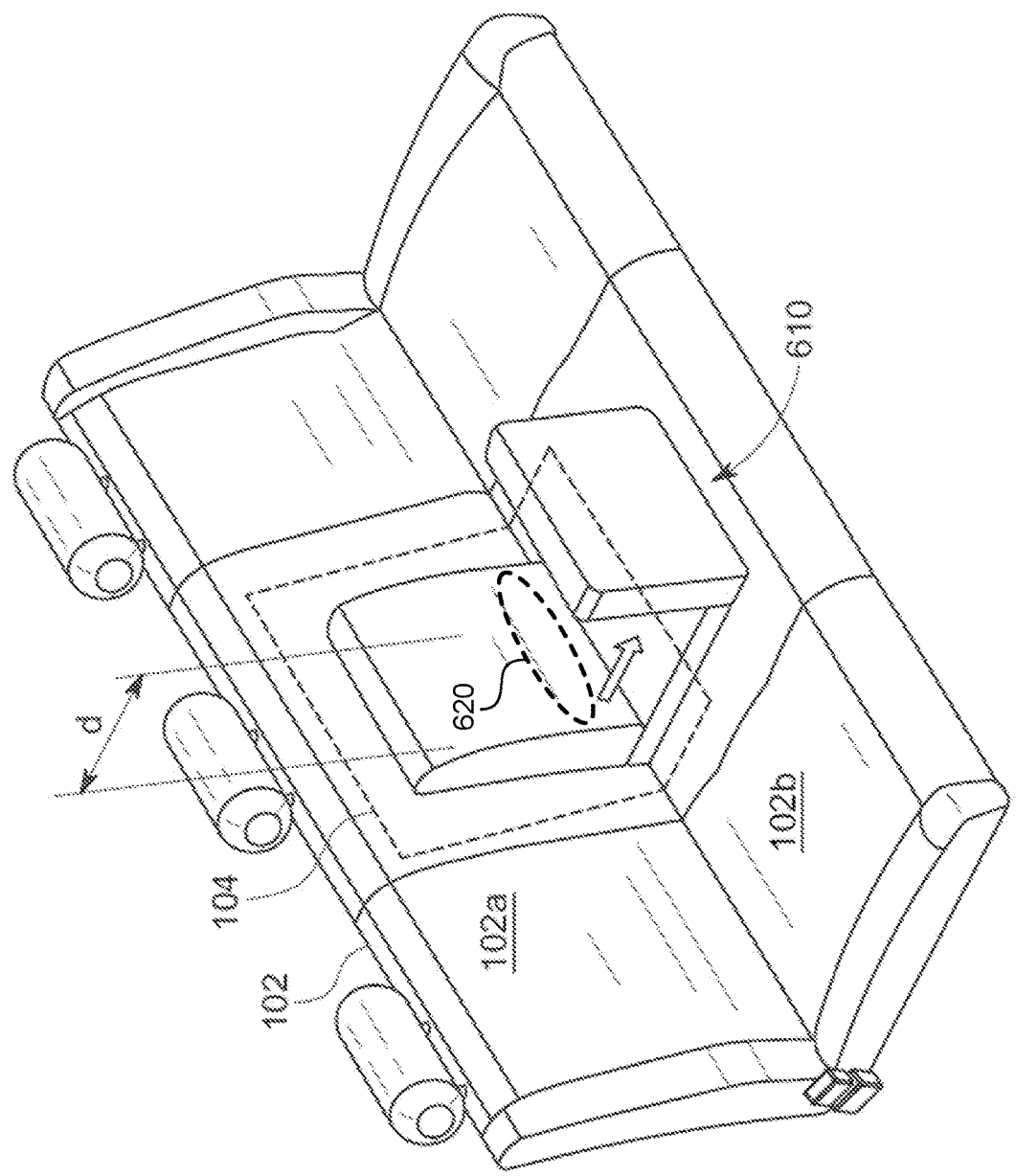
FIG. 6B is the example rear-facing child seat of FIG. 6A in an intermediate state in accordance with embodiments of the technology disclosed herein.

In addition to a front-facing and/or booster-style child seat, the child seat portion 104 can be configured to generate a retractable rear-facing baby seat. FIGS. 6A and 6B illustrate an example rear-facing child seat 600 in accordance with embodiments of the technology disclosed herein. As illustrated, the child seat portion 104 may be configured to provide a rear-facing baby seat 610. The embodiment illustrated in FIG. 6A shows the rear-facing child seat 610 being disposed in a child seat portion 104 of the back portion 102a of the rear seat 102, and the discussion with respect to FIG. 2A is applicable to the embodiment of FIGS. 6A and 6B. As illustrated in FIG. 6B, the rear-facing child seat 610 can be placed in the engaged state by pivoting from the retracted state in child seat portion 104 into an engaged state wherein the rear-facing child seat 610 rests on top of a bottom portion 102b of the rear seat 102. In various embodiments, a leg cavity 620 may be generated in child seat portion 104. A common issue with current rear-facing seats is that despite being safer than front-facing child seats, the rear-facing child seats are limited in the leg room provided. To overcome this issue, embodiments of the present disclosure can be configured where one or more conformable regions of the child seat can be configured to generate a cavity in the back portion 102a of the rear seat 102 to accommodate the length of a child's legs. As illustrated, the leg cavity 620 may comprise a single cavity spanning the width of the child seat, while in other embodiments the leg cavity 620 may comprise two areas, one configured to provide a cavity for each of the child's legs. The operation of the rear-facing child seat 610 may be similar to the operation of the child seat portion 104 and child seat 300 discussed with respect to FIGS. 1-5.

Figure 7:
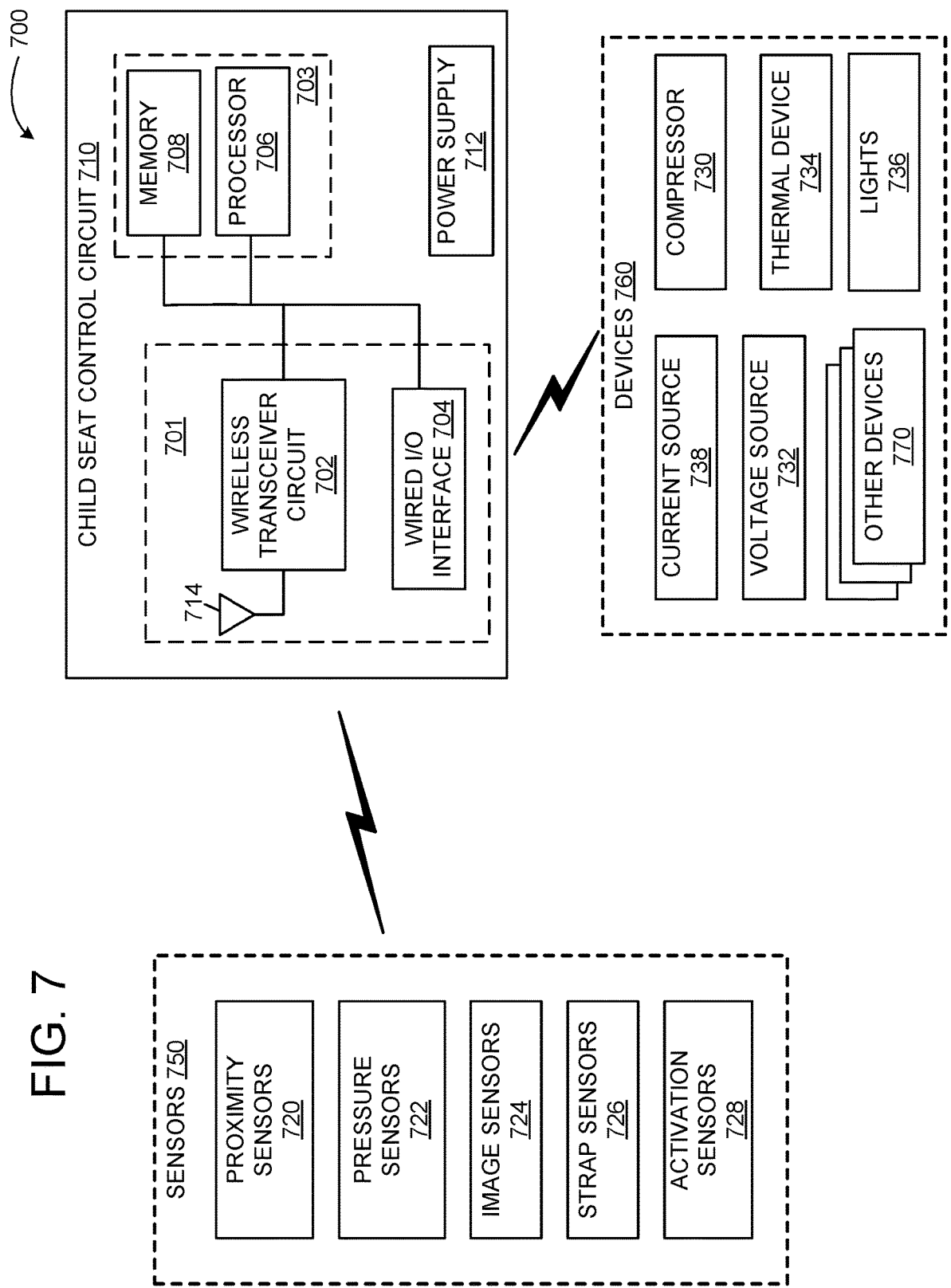
FIG. 7 illustrates an example architecture for controlling a child seat portion of a rear seat in accordance with embodiments of the technology disclosed herein.

FIG. 7 illustrates an example architecture for operating a reconfigurable child seat system 700 in accordance with embodiments of the present disclosure. The reconfigurable child seat system 700 can be used to control manipulation of the child seat of the example child seat portion 104 discussed with respect to FIGS. 1-6B. Referring now to FIG. 7, in this example, reconfigurable child seat system 700 includes a child seat control circuit 710. Child seat control circuit 710 can be implemented as an electronic control unit (ECU), as part of an ECU, or independently of the ECU.

Child seat control circuit 710 in this example includes a communication circuit 701, a decision circuit 703 (including a processor 706 and memory 708 in this example) and a power supply 712. Components of child seat control circuit 710 are illustrated as communicating with each other via a data bus, although other communication in interfaces can be included.

Processor 706 can include a GPU, CPU, microprocessor, or any other suitable processing system. The memory 708 may include one or more various forms of memory or data storage (e.g., flash, RAM, etc.), and can be made up of one or more modules of one or more different types of memory, and may be configured to store data and other information as well as operational instructions that may be used by the processor 706 to perform the functions of the child seat control circuit 710. In various embodiments, the processor 706 may be configured to execute non-transitory machine readable instructions stored on memory 708 to control the shape and positioning of one or more components of the child seat (e.g., one or more of the conformable regions discussed with respect to FIG. 3) through activation of one or more devices 760 to manipulate the highly compliant materials discussed with respect to FIGS. 1-6B.

Although the example of FIG. 7 is illustrated using processor and memory circuitry, as described below with reference to circuits disclosed herein, decision circuit 703 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a child seat control circuit 710.

Communication circuit 701 can include either or both of a wireless transceiver circuit 702 with an associated antenna 714 and a wired I/O interface 704 with an associated hardwired data port (not illustrated). As this example illustrates, communications with child seat control circuit 710 from sensors 750, devices 760, or a combination thereof can include either or both wired and wireless communications circuits 701. Wireless transceiver circuit 702 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 714 is coupled to wireless transceiver circuit 702 and is used by wireless transceiver circuit 702 to transmit radio signals wirelessly to wireless equipment with which it is connected and to receive radio signals as well. These RF signals can include information of almost any sort that is sent or received by the child seat control circuit 710 to/from other entities, such as the other components shown in FIG. 7.

Wired I/O interface 704 can include a transmitter and a receiver (not shown) for hardwired communications with other devices. For example, wired I/O interface 704 can provide a hardwired interface to other components of the system. Wired I/O interface 704 can communicate with other devices using Ethernet or any of a number of other wired communication protocols whether standardized, proprietary, open, point-to-point, networked or otherwise.

Power supply 712 can include one or more of a battery or batteries (such as, e.g., Li-ion, Li-Polymer, NiMH, NiCd, NiZn, and NiH2, to name a few, whether rechargeable or primary batteries), a power connector (e.g., to connect to vehicle supplied power, etc.), an energy harvester (e.g., solar cells, piezoelectric system, etc.), or it can include any other suitable power supply.

A plurality of sensors 750 and devices 760 may be utilized to operate the components of the reconfigurable child seat system 700. The child seat control circuit 710 receives data from the plurality of sensors 750 and device 760 for use in determining what state to put the child seat and/or configure the child seat. Depending on the data received from the sensors 750, the child seat control circuit 710 can determine configuration parameters for the conformable regions of the child seat concerning whether to place the child seat in specific state (e.g., retracted, engaged, intermediate), and how to conform the conformable regions based on a child's anatomy. In various embodiments, the memory 708 may maintain a database containing configuration data associated with the conformable regions, indicating how each conformable region can be manipulated (e.g., acceptable stimuli, tolerances, etc.). The processor 706 of the decision circuit 703 can access the configuration file associated with a conformable region to determine an amount of stimulation and/or a type of stimulation to manipulate in order to achieve the desired shape, position, and/or material characteristic based on the child's anatomy. In other embodiments, the decision circuit 703 can determine in real-time the various configuration parameters needed to generate the child seat as required.

To manipulate the child seat portion, the child seat control circuit 710 can operate one or more devices 760 for use in controlling the highly compliant materials and/or mechanisms. Devices 760 can include one or more types of actuators configured to apply some type of stimuli to the highly compliant materials. Non-limiting examples of stimuli include heat, light, current, and pressure (e.g., vacuums). In some embodiments, the highly compliant materials may be susceptible to changes based on more than one type of stimuli, with the different stimuli causing different changes in the highly compliant materials. A non-limiting example includes a compressor 730, which may be configured to inflate or deflate the highly compliant materials through interaction with capillary penetration. For example, when a given conformable is required to be expanded to position the child seat in a support position based on the child's anatomy, the compressor 730 can be turned on to push a fluid through the capillaries within the highly compliant material to reconfigure the highly compliant material or a compliant mechanism comprising the material from a first position to second position (consistent with the determined shape and/or position based on the child's anatomy). In various embodiments, the fluid can be a liquid or a gas. In some embodiments, the highly compliant material may be configured to take on a particular shape when fluid is added.

The reconfigurable child seat system 700 may further include a voltage source 732 and/or current source 738. Various soft robotics materials (e.g., LCEs) can be controlled using electrical signals, such as electroactive polymers. By applying electrical signals to the material, it can be controlled to take on a variety of characteristics, from varying hardness to different shapes. In embodiments where the highly complaint materials used in the child seat portion comprises an electrically-controlled material, voltage source 732 and/or current source 738 can be used to apply the necessary electrical signal to the material. In some embodiments, the power supply 712 can serve as the voltage source 732 and/or the current source 738, while in other embodiments the voltage source 732 and/or the current source 738 may be a battery or other electrical storage device disposed in or near the child seat portion. In some embodiments, the voltage source 732 and/or the current source 738 can be associated with all of the highly complaint materials and/or conformable regions, a subset of the highly complaint materials and/or conformable regions, or with a discrete highly complaint material and/or conformable region. In various embodiments, a plurality of voltage sources 732 and/or current sources 738 can be included within the reconfigurable child seat system 700. When such stimuli are required, the decision circuit 703 can determine to which highly compliant material the electrical signals are to be applied, and the level to be applied to achieve a desired shape, position, and/or characteristics of the child seat portion.

Another device 760 that may be used to manipulate the child seat portion can be a thermal device 734. Thermal device 734 can be configured to change the temperature of the highly compliant materials, causing the characteristics of the material to change. In various embodiments, a thermal device 734 can be disposed throughout the child seat portion, while in other embodiments the thermal device 734 can be independent of but communicatively in contact with the child seat portion (e.g., inductive heating). In some embodiments, a thermal controller may be associated with each thermal device.

In some embodiments, the highly compliant material may be manipulated through the application of light. In such embodiments, one or more lights 736 can be used to control the child seat portion. In various embodiments, the lights 736 can be dispersed within the child seat portion, within the vehicle interior and positioned to communicate light to the child seat portion, or a combination thereof. In some embodiments, each light 736 may be configured to control the manipulation of a discrete highly compliant material, mechanism, or conformable region, while in other embodiments a light 736 may be configured to control a plurality of highly compliant material, mechanism, or conformable region. Non-limiting examples of lights 736 include light emitting diodes (LEDs), organic LEDs (OLEDs), polymer LEDs, laser diode, among others. In some embodiments, one or more other devices 770 may be included in the reconfigurable child seat system 700.

To determine whether the child seat is needed for use and/or to configure the child seat for a child's anatomy, the child seat control circuit 710 can receive data from one or more sensors 750. As shown in FIG. 7, sensors 750 can include one or more proximity sensors 720, pressure sensors 722, cameras 724, strap sensors 726, and/or activation sensors 728. In some embodiments, additional sensors may be included. Proximity sensors 720 can comprise one or more sensors designed to detect when a child is being placed into the child seat after the child seat is in an engaged state. Non-limiting examples of proximity sensors include capacitive sensors, capacitive displacement sensors, radar, LIDAR, infrared (IR) sensors, ultrasound sensors, capacitance sensors, sweat sensors, and hall effect sensors, among others. In various embodiments, a plurality of proximity sensors 720 can be used. Data collected by the one or more proximity sensors 720 can be communicated to the child seat control circuit 710 through the communications circuit 701 for use by the decision circuit 703 in determining whether the child seat portion needs to be in an intermediate state for boarding. For example, after the child seat is activated, the proximity sensors 720 can be used to determine if the child is being loaded and determining whether the intermediate state is required.

In various embodiments, pressure sensors 722 can be used to determine the anatomy of a child, identify when one or more regions of the child seat have reached a shape and/or position providing a sufficient supporting force, or a combination thereof. For purposes of this disclosure, the child seat provides a sufficient supporting force when a respective portion of the child seat (e.g., conformable regions discussed with respect to FIG. 3) is in contact with the child in a safe manner. As a non-limiting example, the conformable regions in the neck provide a sufficient supporting force when the conformable regions are manipulated such that the child's neck and head are supported by the child seat, unlike traditional seats where the neck region is either not in contact with the child's body or is ill-positioned for the child's anatomy. In various embodiments, one or more pressure sensors 722 can be used to determine when the conformable regions have placed the child seat in contact with the child at different points, indicating that the conformable regions can stop being manipulated. The data from the pressure sensors 722 can be used in conjunction with data from one or more other sensors 750 to determine when the conformable regions have been manipulated based on the anatomy of the child. In some embodiments, one or more pressure sensors 722 may be incorporated into the material comprising the child seat. In some embodiments, one or more piezoelectric-based sensors may be included in the material to act as strain gauges and provide information to the decision circuit 703.

Sensors 750 may further include one or more image sensors 724, such as cameras. In various embodiments, the one or more image sensors 724 may be dedicated to use of the child seat, while one or more image sensors 724 may be configured for other uses as well. Image sensors 724 may be disposed throughout the interior of the vehicle, including but not limited to the roof lining, one or more door pillars or sills, the rear view mirror, the interior side of the windshield, the center console, the interior of the rear window, one or more areas on the rear side of the front seats, or a combination thereof. In some embodiments, one or more image sensors 724 can capture images of the child from a variety of different angles and configured to identify the shape of the child's body (i.e., the child's anatomy). In some embodiments, the one or more image sensors 724 can capture images of the child's body from various angles, transmit the image data to the child seat control circuit 710 for use by the decision circuit 703 in determining the child's anatomy. The decision circuit 703 can include non-transitory machine readable instructions stored on the memory 708 and executable by the processor 706 to determine the child's anatomy. In various embodiments, the image sensors 724 may comprise an active pixel sensor (e.g., a complementary metal-oxide-semiconductor (CMOS)) or a charge-coupled device (CCD), and variations of those types. Non-limiting examples of image sensors 724 include traditional image-capture sensors (e.g., regular cameras), thermal imaging devices, radar, lidar, sonar, low-light imaging devices, among others. The image sensors 724 in accordance with the technology disclosed herein are not limited to any specific type of image sensor 724, and any image sensor 724 which provides image data relevant to mapping the anatomy of the child is applicable.

The sensors 750 may include strap sensors 726 configured to detect when a restraining strap is engaged with the locking mechanism of the child seat. In various embodiments, the strap sensors 726 can be configured to further detect whether the restraining strap is properly installed. As a non-limiting example, one or more strap sensors 726 can be configured to detect whether the restraining strap is properly positioned across the child's anatomy to properly secure the child in the seat, and one or more strap sensors 726 can be configured to detect if the restraining strap is locked into a mating receptacle. In various embodiments, the one or more strap sensors 726 may be disposed along a length of the restraining strap, the child seat portion, the receptacle, or a combination thereof. The strap sensors 726 can transmit its data to the child seat control circuit 710 in a similar manner as those discussed above with respect to the other devices 760 and sensors 750 with the communications circuit 701.

The sensors 750 may further include one or more activation sensors 728 configured to detect when the child seat is being activated. As discussed above, the child seat portion is configured such that, when not in use, the child seat portion does not interfere with the use of the entire length of the rear seat in the vehicle. The activation sensors 728 can be configured to indicate when the child seat portion needs to be manipulated such that the child seat is usable. In some embodiments, one or more activation sensors 728 may be configured to detect when a person has manually moved the child seat from the retracted position as discussed above with respect to FIGS. 1, 2A, and 2B. The one or more activation sensors 728 may be configured to detect the movement of the second part of the child seat from the retracted state, through methods including but not limited to contact sensors, image sensors, or other motion sensors configured to determine when a portion of the seat has moved from the retracted state.

In some embodiments, one or more activation sensors 728 may be configured to detect a signal or other indication that a person wants to activate the child seat portion. The signal or other indication may be caused by triggering of a switch or other actuation means, the one or more activation sensors 728 being configured to detect the transmission of the signal and/or the actuation of a triggering means. In various embodiments, the activation sensors 728 may comprise circuitry for detecting the signals and/or other triggering means, and transmitting such data to the child seat control circuit 710.

In various embodiments, other sensors may be included in addition to those discussed above. In various embodiments, one or more sensors may be included that are configured to provide feedback on the expansion of the conformable regions in order to ensure that the seat is adequately contacting the child without unduly applying pressure on the child. As a non-limiting example, the state of expansion may be determined based on the refractive index of the material. As the material of the conformable region expands or changes shape, the refractive index of the material will change. In some embodiments, a light source (e.g., one or more of the lights 736) may be used to shine light onto, into, and/or through the material of the conformable region. One or more detectors or image sensors may detect how the light is scattered or moves through the material, and the refractive index can be determined by the detector or image sensor, or the data can be communicated to the decision circuit 703 to make the determination. As another non-limiting example, an IR source, a polarizer, and a detector can be used to measure the optical polarization of the conformable regions. The change in the optical polarization is an indication of the amount of expansion or change in the shape of the conformable region has occurred. Another non-limiting example is a system for checking the ohmic resistance across the conformable region, which may be accomplished by applying a voltage across the conformable region by a voltage source like those discussed above. Where added pressure (i.e., the child's body) is applied in certain regions the overall resistance in the material may be different, providing feedback as to whether the conformable region is unduly contacting the child.

Figure 8:
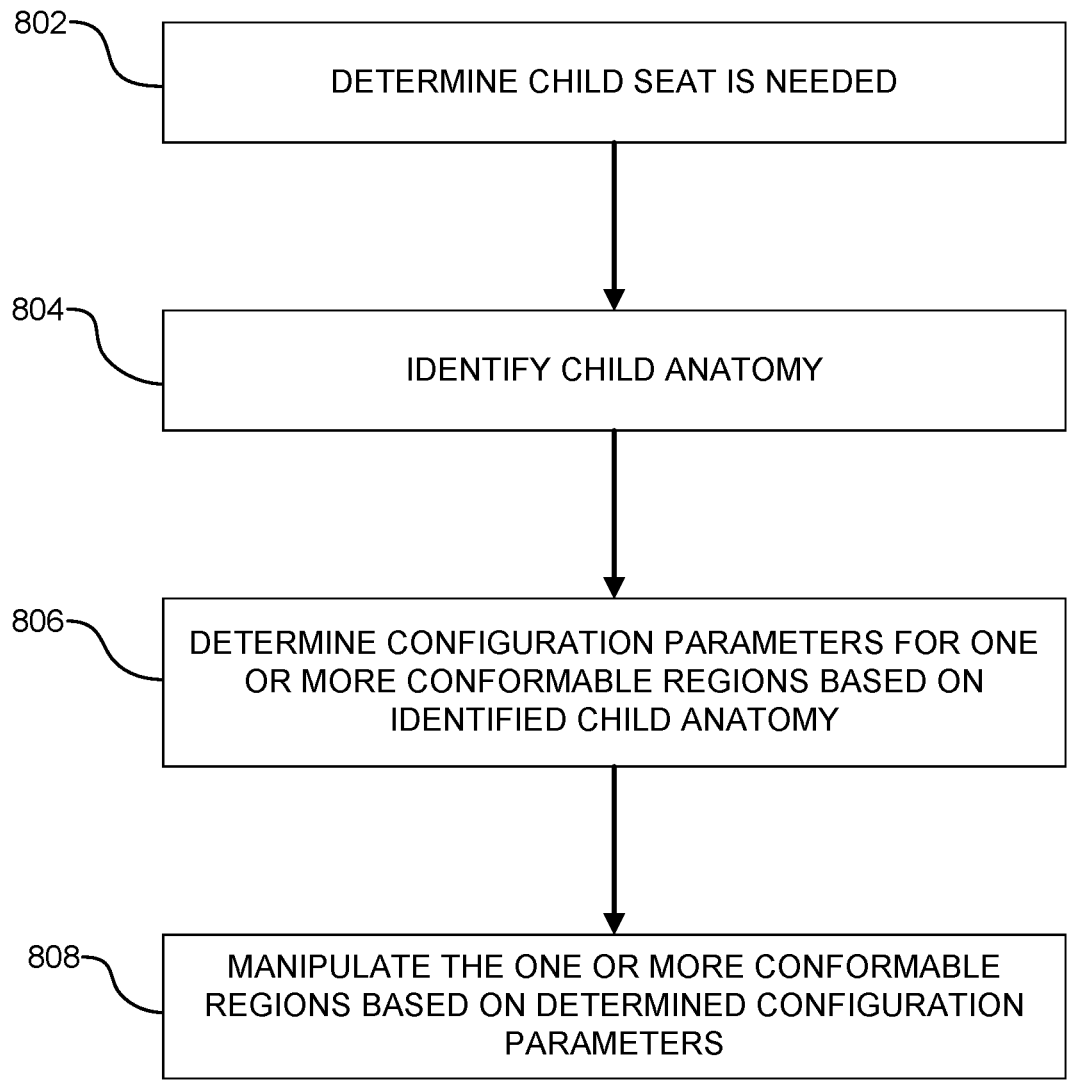
FIG. 8 is an example method in accordance with embodiments of the technology disclosed herein.

FIG. 8 illustrates an example method 800 in accordance with embodiments of the technology disclosed herein. The example method 800 is provided for illustrative purposes only, and may include greater or fewer operations than those explicitly illustrated. Method 800 and any other method disclosed herein may be embodied as non-transitory machine readable instructions stored on a non-transitory medium (e.g., memory 708 of FIG. 7), and executable by a processor or processing circuitry (e.g. processor 706 of FIG. 7). The method 800 of FIG. 8 should not be interpreted as limiting the scope of the methods applicable to only the recited operation. As shown in FIG. 8, at operation 802 whether the child seat is needed is determined. Determining the child seat is needed can be performed by a processor or processing circuit, such as the decision circuit 703 discussed above with respect to FIG. 7.

In various embodiments, determining if the child seat is needed can be determined based on the detection of an activation signal by one or more activation sensors, such as the activation sensors discussed above with respect to FIG. 7. In some embodiments, the determination may be made by the processor using data received from one or more sensors 750 discussed with respect to FIG. 7. As a non-limiting example, one or more activation signals may detect that all or part of the child seat in the child seat portion is moved from the retracted state through manual action or detect a signal indicating that one or more actuators are triggered to move the child seat automatically out of the retracted state, and data from one or more other sensors may further indicate the need for the child seat (e.g., identification of a child of a size requiring a child seat by one or more image sensors). This is meant as an example only and should not be interpreted as the only way in which operation 802 may be performed. In some embodiments, determining the need for the child seat may further include determining whether the child seat needs to be placed in an intermediate state.

At operation 804, the child's anatomy may be identified. Identifying the child's anatomy enables the child seat to conform to the child's anatomy in order to provide customizable support for the child, rather than the one-size-fits-all approach of traditional child seats. In various embodiments, identifying the child's anatomy may be performed through the use of various sensors, such as the sensors 750 discussed with respect to FIG. 7. As a non-limiting example, one or more image sensors may capture images of the child from different angles, one or more proximity sensors may detect a size and/or height of the child, and one or more pressure sensors may detect the position of various features of the child's anatomy (e.g., shoulders, thighs, head, etc.), and the processor may utilize all or some of the this data in identifying the child's anatomy. Identifying the child's anatomy may result in a mapping of various features of the child to locations on the child seat. Based on this mapping, the processor can determine which conformable regions of the child seat correspond to different areas of the child's anatomy.

After identifying the child's anatomy, the processor may determine configuration parameters for one or more conformable regions based on the identified child anatomy at operation 806. As discussed above, the child seat may comprise a plurality of conformable regions that may be individually conformable to accommodate the specific anatomy of a given child. In various embodiments, the configuration parameters may include a type and amount of stimulation to apply to each respective conformable region such that the conformable region is manipulated into a position and/or shape based on the identified anatomy. In some embodiments, determining the configuration parameters may comprise accessing one or more database records stored on a memory of the child seat system and storing information on the type of highly compliant material present in each conformable region and applicable forms of stimulation to manipulate those conformable regions.

At operation 808, the one or more conformable regions are manipulated based on the determined configuration parameters. Manipulation can comprise applying one or more types of stimuli to highly compliant materials present in each given conformable region. In some embodiments, the stimuli may be applied directly to highly compliant material encompassing the conformable region, while in other embodiments the stimuli may be applied to highly compliant material portions of highly compliant mechanisms within the conformable region.

Although discussed with respect to a rear vehicle seat, the technology disclosed herein is not limited solely to rear seats. A person of ordinary skill in the art would understand that the technology is applicable to any position wherein a child may be restrained in a vehicle or other conveyance. As a non-limiting example, the child seat portion discussed with respect to FIGS. 1, 2A, and 2B may be disposed in a front seat of a vehicle, and configured to operate in a similar manner as discussed with respect to the rear seat.

Figure 9:
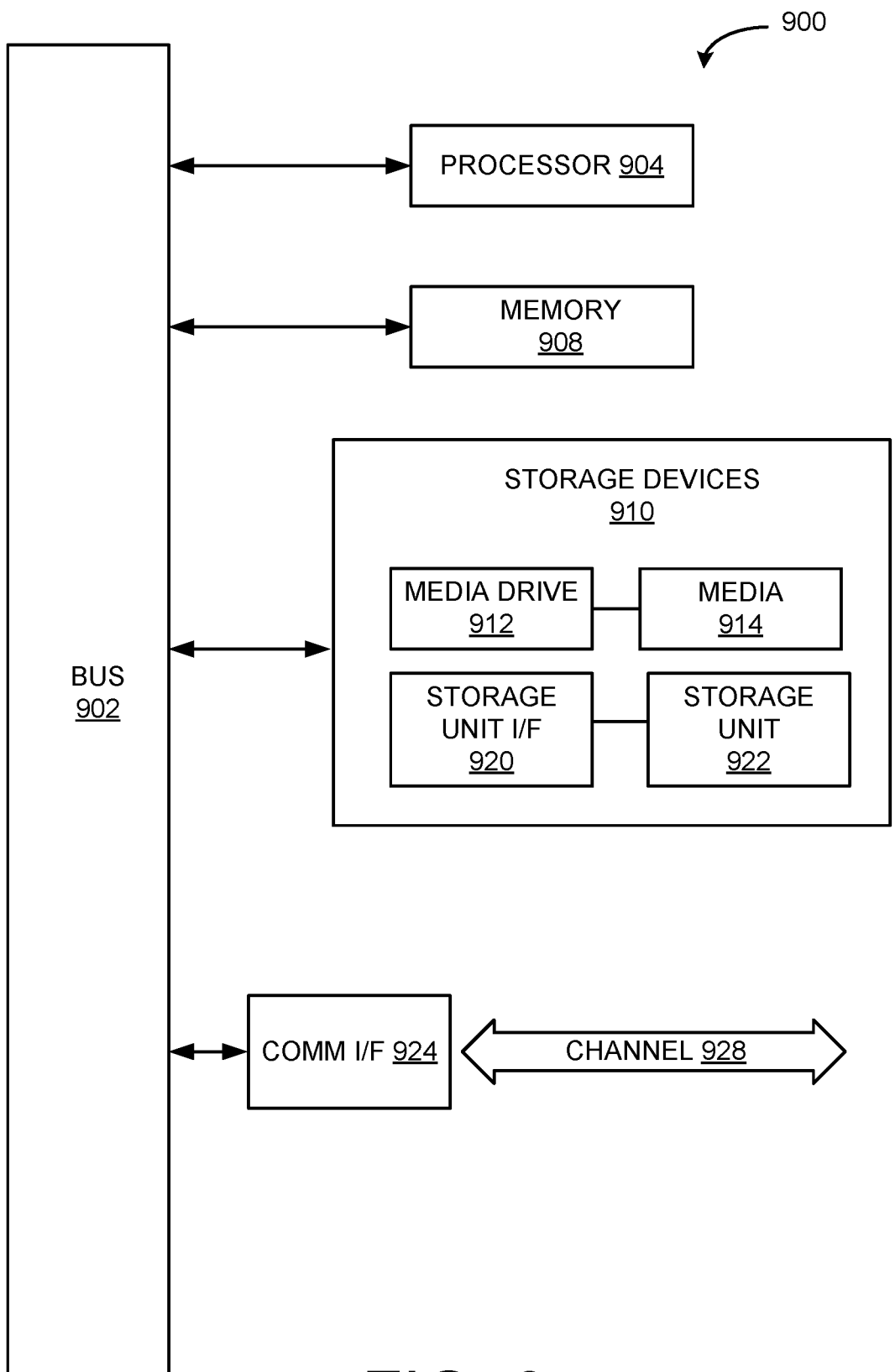
FIG. 9 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 9. Various embodiments are described in terms of this example-computing component 900. After reading this description, it will become apparent to a person skilled in the relevant art how to implement the application using other computing components or architectures.

Referring now to FIG. 9, computing component 900 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, portable computing devices, and other electronic devices that might include some form of processing capability.

Computing component 900 might include, for example, one or more processors, controllers, control components, or other processing devices. Processor 904 might be implemented using a general-purpose or special-purpose processing engine such as, for example, a microprocessor, controller, or other control logic. Processor 904 may be connected to a bus 902. However, any communication medium can be used to facilitate interaction with other components of computing component 900 or to communicate externally.

Computing component 900 might also include one or more memory components, simply referred to herein as main memory 908. For example, random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid-state drive, a magnetic tape drive, an optical drive, a compact disc (CD) or digital video disc (DVD) drive (R or RW), or other removable or fixed media drive might be provided. Storage media 914 might include, for example, a hard disk, an integrated circuit assembly, magnetic tape, cartridge, optical disk, a CD or DVD. Storage media 914 may be any other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot. Other examples may include a PCMCIA slot and card, and other fixed or removable storage units 922 and interfaces 920 that allow software and data to be transferred from storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 924 may be carried on signals, which can be electronic, electromagnetic (which includes optical) or other signals capable of being exchanged by a given communications interface 924. These signals might be provided to communications interface 924 via a channel 928. Channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A reconfigurable vehicle interior comprising:
a rear seat comprising a child seat portion, the child seat portion comprising a conformable region comprising a compliant material;
a sensor communicatively coupled to a processor configured to control operation of the child seat portion; and
a device communicatively coupled to the processor and configured to apply stimuli to the compliant material of the conformable region,
wherein activation of the device causes a stimulus to be applied to the compliant material to cause the conformable region of the child seat portion to expand to form a child seat that is distinct from the rear seat, and
wherein application of the stimulus causes the child seat portion to transition from a retracted state in which the child seat portion is flush with the rear seat to an engaged state in which the child seat is formed and at least part of the child seat portion is raised with respect to the rear seat.

2. The reconfigurable vehicle interior of claim 1, wherein the child seat portion is disposed in a back portion of the rear seat.

3. The reconfigurable vehicle interior of claim 1, wherein the child seat portion comprises a first part disposed in a back portion of the rear seat and a second part disposed in a bottom portion of the rear seat.

4. The reconfigurable vehicle interior of claim 1, wherein the child seat portion is not identifiable when in a retracted state.

5. The reconfigurable vehicle interior of claim 1, comprising a plurality of conformable regions including a conformable back region, a conformable side region, and a conformable base region.

6. The reconfigurable vehicle interior of claim 1, wherein the conformable region comprises a compliant mechanism comprising a non-compliant material portion and a compliant material portion.

7. The reconfigurable vehicle interior of claim 6, wherein the compliant mechanism is configured to conform from a first shape to a second shape in response to application of the stimuli by the device.

8. The reconfigurable vehicle interior of claim 1, wherein the sensor comprises a proximity sensor, a pressure sensor, an image sensor, a strap sensor, or an activation sensor.

9. The reconfigurable vehicle interior of claim 8, wherein the sensor is the activation sensor, and wherein the activation sensor is configured to detect a signal indicating a need for the child seat to be formed from the child seat portion.

10. The reconfigurable vehicle interior of claim 8, wherein the processor is configured to determine an anatomy of a child based on data received from the sensor, and wherein application of the stimulus to the compliant material causes the conformable region to conform to the anatomy of the child.

11. A method comprising:
   determine, by a processor associated with a child seat portion of a rear seat of a vehicle, that a child seat is needed;
   identify, by the processor, an anatomy of a child;
   determine, by the processor, a configuration parameter for a conformable region of the child seat portion based on the identified anatomy; and
   manipulate, by the processor, the conformable region of the child seat portion based on the determined configuration parameter to cause the conformable region to expand to form the child seat, wherein manipulation of the conformable region causes the child seat portion to transition from a retracted state in which the child seat portion is flush with the rear seat to an engaged state in which the child seat is formed and at least part of the child seat portion is distinct from and raised with respect to the rear seat.

12. The method of claim 11, wherein determining the child seat is needed comprises detecting an activation signal by an activation sensor.

13. The method of claim 11, wherein identifying the anatomy of the child comprises capturing a plurality of images of the child by an image sensor.

14. The method of claim 11, wherein determining the configuration parameter comprises retrieving a database record from a memory associated with the child seat portion.

15. The method of claim 11, wherein manipulating the conformable region comprises applying at least one type of stimuli to a compliant material disposed within the conformable region.

16. A reconfigurable child seat portion of a rear seat comprising:
   a first part disposed in a back portion of the rear seat;
   a second part disposed in a bottom portion of the rear seat; and
   an actuator configured to transition the first part and the second part from a retracted state to an engaged state,
   wherein the first part comprises a conformable back region and a conformable side region, and the second part comprises a conformable base region,
   wherein the actuator is configured to transition the first part and the second part from the retracted state to the engaged state by applying a stimulus to at least one conformable region of the first part or the second part to cause the at least one conformable region to expand to form a child seat that is distinct from the rear seat, and
   wherein the child seat portion comprises a leg cavity that becomes exposed after the child seat is formed.

17. The reconfigurable child seat portion of claim 16, wherein the child seat portion is not identifiable when in the retracted state.

18. The reconfigurable child seat portion of claim 16, wherein each of the conformable back region, the conformable side region, and the conformable base region comprises a compliant mechanism, each compliant mechanism comprising a non-compliant material portion and a compliant material portion.

19. The reconfigurable child seat portion of claim 16, wherein, in the retracted state, the child seat portion is flush with the rear seat and, in the engaged state, at least one of the first part or the second part is raised with respect to the rear seat.

20. The reconfigurable child seat portion of claim 16, wherein the leg cavity comprises a first area and a second area configured to independently receive respective legs of a person seated in the child seat.

* * * * *